No. 620,509. Patented Feb. 28, 1899.
S. J. & E. S. SHIMER.
TYPE BAR.
(Application filed Nov. 15, 1898.)
(No Model.)
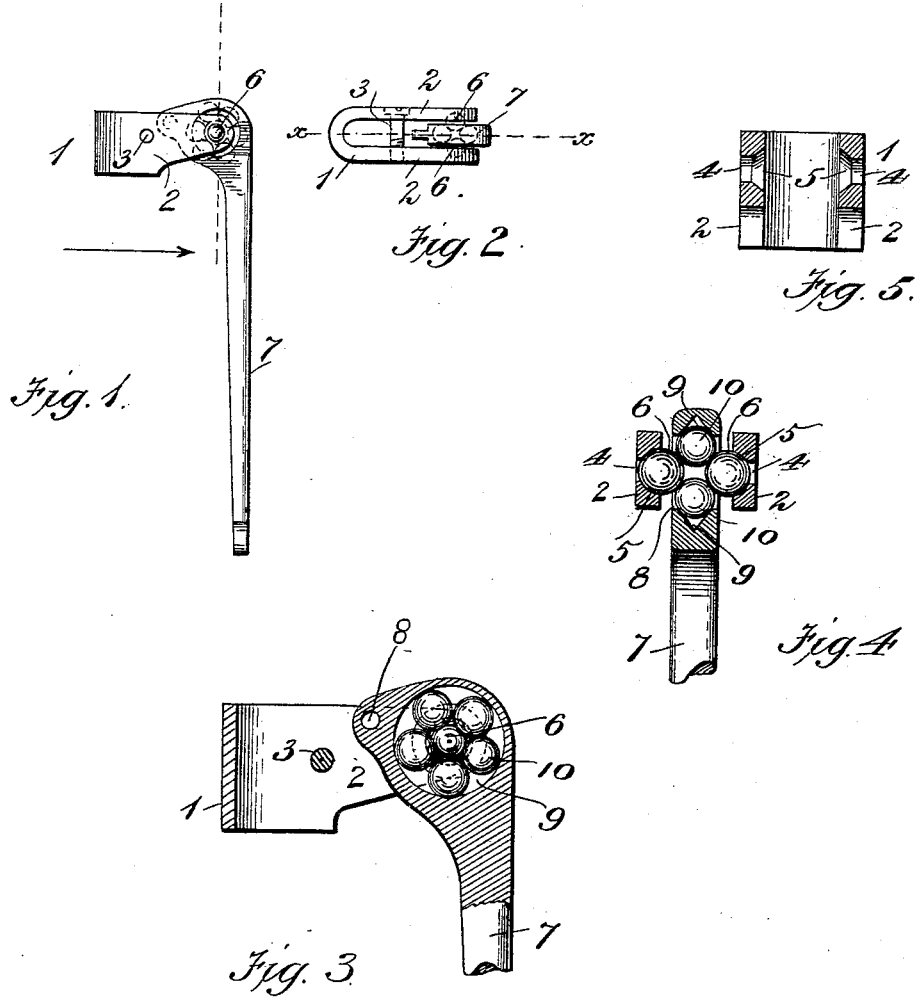

UNITED STATES PATENT OFFICE.

SAMUEL J. SHIMER AND ELMER S. SHIMER, OF MILTON, PENNSYLVANIA.

TYPE-BAR.

SPECIFICATION forming part of Letters Patent No. 620,509, dated February 28, 1899.

Application filed November 15, 1898. Serial No. 696,563. (No model.)

*To all whom it may concern:*

Be it known that we, SAMUEL J. SHIMER and ELMER S. SHIMER, citizens of the United States, residing at Milton, in the county of Northumberland and State of Pennsylvania, have invented new and useful Improvements in Type-Bars, of which the following is a specification.

Our invention relates to the bearings of the journals of the type-bars of type-writing machines; and its object is to provide an improved construction of the same, whereby the friction is reduced to a minimum, while at the same time lateral movement of the type-bars is prevented.

The invention consists, essentially, in the combination, with the hanger of a type-writing machine formed with opposite holes, the inner sides of which are recessed, forming sockets, and the balls seated therein, of the type-bars formed with a hole and a V-shaped groove and the small balls of a diameter less than the width or thickness of the bar seated in said groove and against which balls the balls of the hanger bear, as hereinafter fully described and claimed.

In the accompanying drawings, Figure 1 is a side elevation of a type-bar and hanger constructed in accordance with our invention. Fig. 2 is a plan view of the same. Fig. 3 is a section on the line $x$ $x$, Fig. 2, showing the device on an enlarged scale. Fig. 4 is a transverse section. Fig. 5 is a transverse section of the hanger.

In the said drawings the reference-numeral 1 designates the hanger of a type-bar, consisting of a plate of spring metal bent over at the center, forming two parallel arms 2, formed intermediate the ends with opposite screw-threaded holes, through which passes an adjusting-screw 3 for regulating the tension of the balls, as hereinafter described. Near the ends said arms are formed with opposite holes 4, which are recessed in the inner ends, forming sockets 5 to receive the large balls 6.

The numeral 7 designates the type-bar, having a hole 8 near one end and with a V-shaped groove 9. Seated in this groove are a number of small balls 10, the diameters of which are less than the thickness of the bar, so that they will not project beyond the sides of the bar. As shown, we preferably employ five of these small balls, but the number is immaterial, but should be so proportioned with respect to the large balls as to form sockets, as it were, for the latter. The large or side balls bear upon the small balls in the groove of the type-bar, so that in use there will be but little contact therebetween and will form roller-bearings, so that the friction will be reduced to a minimum. Lateral displacement of the bars will be prevented and the tension of the balls can be regulated by the adjusting-screw, so as to compensate for wear. The alinement of the bar depends upon the traverse of the balls in the groove about an imaginary axis of the bar in line therewith. In other words, the axis of rotation upon which the alinement depends is in line with the bar.

It will be noted that the balls seated in the groove or seat of the type-bar do not project beyond the sides thereof, so that comparatively large balls may be used therein without unduly widening the hanger.

Having thus fully described our invention, what we claim is—

1. A ball-bearing for the type-bars of type-writing machines, having two opposite center balls and a single series of other balls surrounding said opposite balls, and seats therefor in the type-bar and hanger, substantially as described.

2. The combination with the type-bar of a type-writing machine having a hole extending therethrough formed with a groove or seat and the balls seated therein, of the side balls seated in recesses in the hanger and bearing against the balls of the type-bar on opposite sides, substantially as described.

3. The combination with a type-bar of a type-writing machine, having a hole extending therethrough and formed with a V-shaped seat, or groove, and a single series of balls seated therein, of the hanger formed with opposite recesses and the side balls seated therein and bearing against opposite sides of the balls seated in the groove or seat of the type-bar, substantially as described.

4. The combination with the type-bar of a type-writing machine formed with an opening and a circular groove, of the balls seated in said groove of a smaller diameter than the thickness of the said bar and the hanger formed with opposite recesses, and the large balls seated therein and bearing against opposite sides of the balls seated in said groove, substantially as described.

In testimony whereof we have hereunto set our hands in presence of two subscribing witnesses.

SAMUEL J. SHIMER.
ELMER S. SHIMER.

Witnesses:
GEO. S. SHIMER,
W. H. BECK.